Dec. 16, 1958     F. S. SPRING     2,864,437
SAFETY HARNESS
Filed Sept. 11, 1957
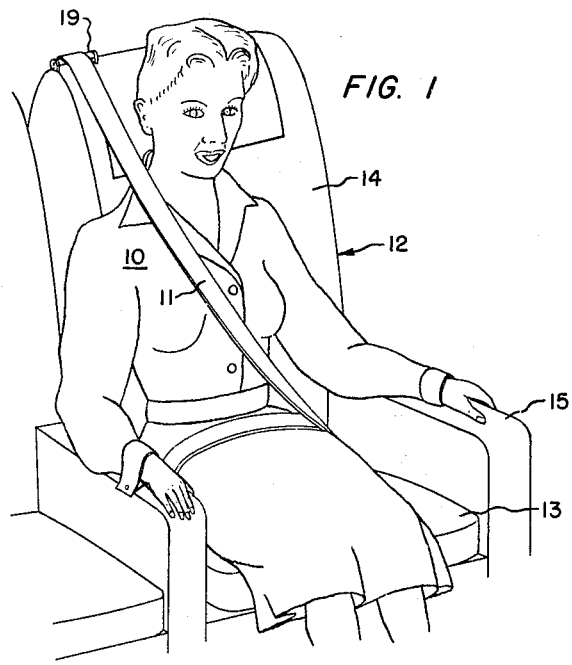
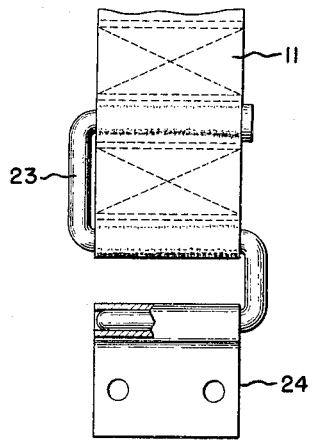
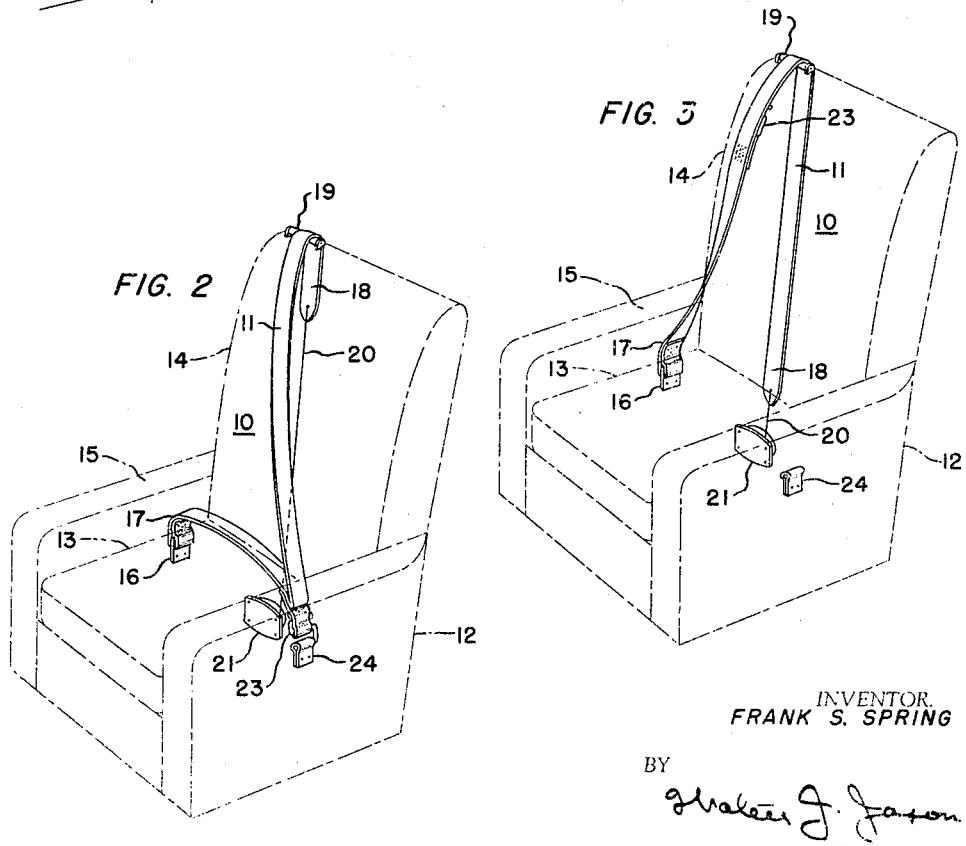
INVENTOR.
FRANK S. SPRING
BY
ATTORNEY

United States Patent Office 2,864,437
Patented Dec. 16, 1958

2,864,437

SAFETY HARNESS

Frank S. Spring, Duarte, Calif.

Application September 11, 1957, Serial No. 683,311

4 Claims. (Cl. 155—189)

The present invention relates to safety harnesses and more particularly to an improved harness for restraining the occupant of an airplane or automobile seat from ejection therefrom when sudden acceleration forces develop.

Seat belts are used in connection with vehicles such as aircraft and automobiles in an effort to protect the passengers in the event of a collision, crash landing or a sudden stop. In aircraft the use of a restraining device is necessary during periods of abnormal travelling conditions, as when the airplane is flying through a storm or even in clear weather while flying over rough or mountainous terrain where sudden updrafts cause the craft to toss, pitch, or rise and fall. Under such conditions, passengers are customarily instructed to fasten their seat belts in order to avoid harm which might occur should they be thrown from their seats. Here the usual seat belts are normally sufficient to protect the passengers. However, the usual seat belts are of the lap type and do not afford adequate protection where high propelling forces are developed as in the event of a sudden stop or slowing such as occurs in a collision or crash landing. Although the passenger may be held securely to the seat by the usual seat belts, such belts, when high acceleration forces occur cannot prevent the head and the upper unsupported portion of the body from pitching forward and striking an instrument panel, windshield, the seat ahead, or other stationary equipment in the area of the passenger.

Thus it is a purpose of the present invention to provide an improved form of safety harness which effectively restrains a passenger within his seat, such harness embodying a construction which holds the lower torso to the seat while also preventing rapid movement of the upper torso and head.

In addition to affording protection the safety harness, if it is to be cheerfully accepted by the passenger, should be of a construction as to permit the passenger to fasten the harness about the body with the least amount of effort and in an uncomplicated manner. The time required to fasten the harness in place is an important consideration since advance notice of an unusual flying condition may be very short.

An awkward and uncomfortable or complicated safety harness may create a reluctance on the part of the passenger to use it. Psychologically a safety harness should not be too conspicuous or prominent as to instill a feeling of insecurity.

Accordingly, an important object of this invention is to provide an improved form of safety harness which is adapted to be positioned about a shoulder and the lap of a passenger and fastened to the seat frame in a simple and quick manner.

Another object of this invention is to provide a seat harness which automatically positions itself to one side of the seat when not in use thereby contributing to the comfort of the seat occupant.

Another object of the present invention is to provide a seat harness embodying a one-piece strap construction adapted to be comfortably worn by a passenger and which is effective to restrain the entire torso of the passenger against sudden forces tending to propel the passenger from his seat.

Another object of this invention is to provide an improved means for restraining the occupant of a vehicle seat embodying a harness as above and having one end of the harness permanently attached to the seat structure and the opposite end attached to an inertia reel whereby the strap normally yieldably restrains the passenger and is effective under collision or crash conditions to positively secure him against being thrown from his seat.

Other objects and features of the present invention will be readily apparent to those skilled in the art from the following specification and appended drawings wherein is illustrated a preferred form of the invention, and in which:

Figure 1 is a perspective view of a typical passenger seat such as found in aircraft, trains, buses and the like and illustrating a seated passenger protected by a safety harness embodying the novel features of the present invention.

Figure 2 is another perspective view of the present seat harness, showing its association with an inertia reel and the manner of its being fastened to the seat, the seat being shown in dash-dot outline.

Figure 3 is a view similar to Figure 2 but with the safety harness lying in unfastened position.

Figure 4 is an enlarged detail view of a fastening means which may be employed in the present invention.

Referring now in detail to the drawings, a safety harness is indicated generally by the numeral 10 and comprises an elongated, one-piece strap or belt 11 which may be conveniently fabricated from a woven fabric such as nylon having good strength to weight ratio and having long wearing characteristics. It is understood that the particular cloth or webbing employed is not of the essence of this invention since any commercially available woven textile material customarily employed in the making of seat belts may be used in fashioning strap 11.

The present safety harness 10 is shown, for illustrative purposes, in association with a typical aircraft seat 12 comprising a horizontal seat portion 13, a vertical back rest 14, and arm rests 15 of suitable construction.

A metallic fitting 16 is provided at one terminal end 17 of strap 11, the strap being conveniently fixedly secured to the fitting by a usual multiple stitched hem. Fitting 16 is adapted to be attached, as by bolting, to a portion of the frame of the seat 12, at a point which would be generally adjacent to a hip of an occupant of the seat. If desired, the fitting 16 may be secured to the structure of the aircraft or vehicle, itself, and the strap 11 would then be made of sufficient length to reach the fitting. Strap 11 extends from its point of attachment toward the back rest 14 and, as shown, is carried over the top thereof so that its terminal end 18 lies disposed at the rear of the back rest 14. End 18 may be reinforced as by hemming or may include a metallic plate in the hem for additional strength if desired. A guide 19 is provided on back rest 14 upon which strap 11 rides to prevent excessive wear of the upholstery. To end 18 is suitably secured one end of a cable 20 which extends from a conventional inertia reel 21. Reel 21 is, as shown, located at the rear of seat 12 and its housing may be conveniently secured to the seat structure as by usual bolts and nuts. Preferably the reel 21 is located on the seat structure at a point adjacent the floor to which the seat is anchored. It will be apparent, if made desirable by reason of a particular seat construction, that the reel 21 may be anchored to the floor of the vehicle itself. It is to be understood that inertia reel 21 per se is not a part of the present invention since any suitable, commercially available, reel inertia device may be employed wherein cable 20 may be paid out or reeled in within a predetermined impact load range and caused to be locked against paying out when subjected to extraordinary impact loads such as occurs during a crash. If desired, an inertia reel unit of the general type shown in U. S. Patent No. 2,480,335 may be employed in the present invention. Further, it is to be understood that the use of an inertia reel may be dispensed with, in which case the terminal end 18 of strap 11 may be suitably anchored directly to the seat structure as by a convenient fitting, similar to fitting 16, attached to the rear of back rest 14, while allowing sufficient slack to permit strap 11 to pass comfortably over the upper torso and lap of the seat occupant.

Between the ends of strap 11 there is provided a latching element in the form of a generally S-shaped hook 23 which is suitably secured in place as by appropriately enfolding and sewing material of the strap about portions of the hook. Hook 23 is adapted to be fitted within the eye of a staple 24 suitably fixedly secured to the seat structure at a position adjacent the hip of the seat occupant and on the side of the seat opposite fitting 16. Obviously, hook 23 will be positioned at a point on strap 11 which will permit comfortable spanning of the lap of a seat occupant and a diagonal disposition across the chest of the occupant and which will allow the passenger to readily attach the hook 23 to staple 24 when he desires to be fastened into the seat. Hook 23, as shown, points forwardly so that when inserted in staple 24 any body pressure on the strap 11 tends to more securely hold the hook in place.

When seat harness 10 is not in use it will be drawn by cable 20 to lie and be held taut against and to one side of back rest 14 by the tension of reel 21. When a condition arises necessitating the fastening of seat harness 10 about the body of the seat occupant, the occupant passes one arm between the strap 11 and the back rest 14 to fit his shoulder beneath a portion of the strap and he also grasps hook 23 with one hand pulling the lower portion of strap 11 transversely across his lap in the region of the hips and drawing the upper portion diagonally across the upper torso as cable 20 is paid out from inertia reel 21. Hook 23 is carried completely over to staple 24 and fitted thereinto to complete the operation. With the insertion of hook 23 into staple 24 the strap 11 will be secured in protecting position though the reel 21 will permit normal movements of the body.

To free himself of the harness the passenger merely moves the hook 23 rearwardly until it disengages from staple 24.

It is to be understood that the fasening elements 23 and 24 are merely exemplary of a latching device which may be employed. It is contemplated that any usual commercially available two part latching means may be employed, wherein one part is fixed to the seat structure and the other part is mounted on the strap and is carriable to engagement with the fixed part.

While certain preferred embodiments of the invention have been specifically disclosed it is understood that the invention is not limited thereto as many variations will be readily apparent to those skilled in the art and the invention is to be given its broadest possible interpretation within the terms of the following claims.

What I claim is:
1. A safety harness for association with a vehicle seat having a back rest, said harness comprising a continuous length of strap, attaching means for fixedly securing one end of said strap to one side of said seat, means for holding the other end of said strap at the rear of said back rest, a latch secured to said belt intermediate the ends thereof to divide said strap into a lap portion and a shoulder portion, and means on the other side of said seat releasably engageable by said latch to anchor said harness to said seat with said lap portion disposed transversely and completely across the lap of a wearer and with said shoulder portion disposed over a shoulder and diagonally across the chest of the wearer.

2. A safety harness for association with a vehicle seat having a back rest, said harness comprising a continuous length of strap, attaching means for fixedly securing one end of said strap to one side of said seat, said strap extending over and behind said back rest for connection to a normally yieldable, inertia operated locking means fixedly anchored at the rear of said seat, a latch fixedly secured to said belt intermediate the ends thereof to divide said strap into a lap portion and a shoulder portion, and attaching means fixed on the opposite side of said seat and releasably engageable by said latch to anchor said harness to said seat with said lap portion disposed transversely and completely across the lap of a wearer and with said shoulder portion disposed over a shoulder and diagonally across the chest of the wearer.

3. A safety harness for association with a vehicle seat having a back rest, said harness comprising a single length of strap, attaching means for fixedly securing one end of said strap to one side of said seat in the area of a hip of a seat occupant, said strap extending over and behind said back rest for connection to a normally yieldable, inertia operated locking means fixedly anchored at the rear of said seat, a latch fixedly secured to said belt intermediate the ends thereof to divide said strap into a lap portion and a shoulder portion, and attaching means fixed to the opposite side of said seat in the area of the other hip of the seat occupant, said attaching means being releasably engageable by said latch to anchor said harness to said seat with said lap portion disposed transversely and completely across the lap of a wearer and with said shoulder portion disposed over a shoulder and diagonally across the chest of the wearer.

4. A safety harness for association with a vehicle seat having a back rest, said harness comprising a continuous length of strap, attaching means for fixedly securing one end of said strap to one side of said seat, said strap extending over and behind said back rest, yieldable, inertia operated locking means positioned at the rear of said seat for normally holding said strap in a straight-line position extending from said attaching means over said back rest, a latch fixedly secured to said belt intermediate the ends thereof to divide said strap into a lap portion and a shoulder portion, and attaching means fixed on the opposite side of said seat and releasably engageable by said latch to anchor said harness to said seat with said lap portion disposed transversely and completely across the lap of a wearer and with said shoulder portion disposed over a shoulder and diagonally across the chest of the wearer.

References Cited in the file of this patent
UNITED STATES PATENTS

| | | |
|---|---|---|
| 2,650,655 | Neahr et al. | Sept. 1, 1953 |
| 2,705,044 | Nolen | Mar. 29, 1955 |
| 2,710,649 | Griswold et al. | June 14, 1955 |
| 2,794,654 | Sullivan | June 4, 1957 |
| 2,804,313 | Gilles | Aug. 27, 1957 |

FOREIGN PATENTS

| | | |
|---|---|---|
| 144,067 | Sweden | Feb. 9, 1954 |